US011114928B2

(12) United States Patent
Pluciński

(10) Patent No.: US 11,114,928 B2
(45) Date of Patent: Sep. 7, 2021

(54) TORQUE MOTOR

(71) Applicant: Hamilton Sundstrand Corporation, Charlotte, NC (US)

(72) Inventor: Wojciech Pluciński, Września (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 37 days.

(21) Appl. No.: 16/516,472

(22) Filed: Jul. 19, 2019

(65) Prior Publication Data
US 2020/0028423 A1    Jan. 23, 2020

(30) Foreign Application Priority Data

Jul. 20, 2018  (EP) .................................... 18461585

(51) Int. Cl.
| | | |
|---|---|---|
| *F16K 31/04* | (2006.01) | |
| *H02K 26/00* | (2006.01) | |
| *F16K 31/08* | (2006.01) | |
| *F15B 13/044* | (2006.01) | |

(52) U.S. Cl.
CPC ............ *H02K 26/00* (2013.01); *F15B 13/044* (2013.01); *F16K 31/042* (2013.01); *F16K 31/082* (2013.01)

(58) Field of Classification Search
CPC ....... H02K 26/00; F16K 31/042; F16K 31/08; F16K 31/082; F15B 13/043; F15B 13/044
USPC .................. 251/129.11–129.13, 65
See application file for complete search history.

(56) References Cited

U.S. PATENT DOCUMENTS

| | | | | |
|---|---|---|---|---|
| 3,189,675 | A * | 6/1965 | Moore .................... | F16K 17/19 174/11 R |
| 3,194,998 | A * | 7/1965 | Marfut .................... | H01J 23/10 313/156 |
| 3,556,150 | A * | 1/1971 | King .................... | F15B 13/0438 137/625.4 |
| 3,570,806 | A * | 3/1971 | Sturman ............... | F16K 31/082 251/65 |
| 4,704,591 | A * | 11/1987 | Hafner ............... | F02M 51/0692 335/229 |
| 4,749,167 | A * | 6/1988 | Gottschall ............... | F01L 9/026 251/129.1 |
| 4,794,890 | A * | 1/1989 | Richeson, Jr. ........ | H01F 7/1646 123/90.11 |
| 8,674,564 | B2 * | 3/2014 | Hessenberger .......... | H02K 7/14 310/50 |

(Continued)

FOREIGN PATENT DOCUMENTS

| | | |
|---|---|---|
| EP | 2922071 A1 | 9/2015 |
| EP | 3321943 A1 | 5/2018 |

OTHER PUBLICATIONS

Extended European Search Report for International Application No. 18461585.4 dated Nov. 13, 2018, 8 pages.

*Primary Examiner* — John Bastianelli
(74) *Attorney, Agent, or Firm* — Cantor Colburn LLP

(57) ABSTRACT

A pole piece for a torque motor includes two separate arcuate members and first and second diametrically opposed attachment portions formed as a single piece of material. Each arcuate member extends in opposite directions from the first attachment portion and following a generally circular path defining a perimeter of the pole piece and meeting each other at the second attachment portion. The arcuate members are devoid of any holes or apertures.

19 Claims, 5 Drawing Sheets

(56) References Cited

U.S. PATENT DOCUMENTS

| | | |
|---|---|---|
| 2015/0270748 A1* | 9/2015 | de la Chevasnerie ... H02K 1/18 310/154.11 |
| 2016/0049230 A1 | 2/2016 | Cichon |
| 2018/0138789 A1* | 5/2018 | Zak .................. H02K 1/223 |

* cited by examiner

TORQUE MOTOR

This application claims priority to European Patent Application No. 18461585.4 filed Jul. 20, 2018, the entire contents of which is incorporated herein by reference.

FIELD

The present disclosure relates generally to a torque motor with an innovative geometry of magnetic components, for example new shapes and configurations of permanent magnets (e.g., pole pieces) and the armature thereof.

BACKGROUND

Torque motors are commonly used to control hydraulic actuators and other, e.g., pneumatic systems, for example as part of a servovalve. The design of a torque motor has become fairly standardised, and many examples of such standard construction may be found in the art. In particular, the magnetic components of a torque motor are typically designed so that they can provide a relatively compact assembly and fit well with the other components of the torque motor.

FIG. 1 shows an example of a cross-section of a conventional torque motor 10, with a view of a lower pole piece 20 in isolation. As is evident from FIG. 1, the lower pole piece 20 comprises a substantially annular piece, having vertical extensions 22 that are configured to sit either side of an armature 50 of the torque motor 10, and opposite an upper pole piece 30 that is essentially a mirror of the lower pole piece 20.

The magnetic elements of a torque motor, such as the pole pieces and armature are typically designed to provide mechanical integrity of the overall torque motor structure whilst providing the required transfer of magnetic flux. The shape of the magnetic elements are designed as a compromise between these structural and magnetic functions.

Additionally, the shape and layout of the magnetic elements is usually optimised for conventional machining processes. This may be evident from the lower pole piece 20 of FIG. 1, from which it can be seen that a simple annular is used, with various drill holes 6 being formed in the lower pole piece 24 insertion of it, e.g., fasteners to secure the torque motor 10 together.

FIG. 1 shows the results of a finite element model analysis as shaded portions of the torque motor 10, during which it was observed that saturation effects can occur at various locations in the conventional magnetic elements. For example, a local saturation effect can be visible at arrow 8 due to the drill holes 6 in the lower pole piece 20. The local saturation has been found to degrade and limit torque motor performance and complicate the magnetic flux throughout the torque motor 10.

It is desired to improve the structure of a torque motor so that magnetic flux distribution is improved.

SUMMARY

In accordance with an aspect of the disclosure, there is provided a pole piece for a torque motor, wherein the pole piece is formed at least partially by two separate arcuate members, each extending in opposite directions and following a generally circular path defining a perimeter of the pole piece, wherein the arcuate members meet each other at diametrically opposed attachment portions of the pole piece.

Use of arcuate members in this manner has been found to improve the magnetic flux distribution and other magnetic properties of the pole piece, for example reduction of saturation effects and/or higher magnetic torque than conventional arrangements.

The arcuate members may have a substantially constant cross-sectional area along a longitudinal axis thereof. For example, the cross-sectional area of the arcuate member(s) may not vary by more than +/−10% along the length thereof. This may further reduce saturation effects. The cross-sectional area in this regard may be a cross-section perpendicular to a longitudinal axis of the arcuate member(s).

The arcuate members may be or comprise generally cuboid projections following the generally circular path.

The arcuate members may be symmetrically opposed to each other, meaning that the magnetic flux through each arcuate member is substantially the same.

Each attachment portion may be configured as a block of material from which each arcuate member extends.

The pole piece may be a single piece of material that is devoid of any holes or apertures.

An outer circumferential surface of the pole piece may have a generally cylindrical profile.

In accordance with an aspect of the disclosure, there is provided an apparatus comprising a lower pole piece and an upper pole piece, wherein at least one of the lower pole piece and the upper pole piece is a pole piece as described above.

The apparatus may further comprise one or more permanent magnets extending between the lower pole piece and the upper pole piece, wherein the permanent magnets are configured to support the upper pole piece in use. The upper pole piece may be supported solely by the permanent magnets in use.

In accordance with an aspect of the disclosure, there is provided a torque motor comprising an apparatus as described above, and further comprising an armature located between the lower pole piece and the upper pole piece.

The armature may extend along a longitudinal axis, and may comprise opposed surfaces located at opposed ends of the armature along the longitudinal axis thereof, wherein the opposed surfaces follow a curved profile corresponding to a curved profile of the lower pole piece and the upper pole piece.

In accordance with an aspect of the disclosure, there is provided a servovalve comprising a torque motor as described above.

In accordance with an aspect of the disclosure, there is provided a method of constructing a torque motor, comprising:

providing at least one pole piece formed at least partially by two arcuate members extending in opposite directions and following a generally circular path defining a perimeter of the pole piece, wherein the arcuate members meet each other at diametrically opposed attachment portions of the pole piece.

The arcuate members may have a substantially constant cross-sectional area along a longitudinal axis thereof.

BRIEF DESCRIPTION OF THE DRAWINGS

Various embodiments will now be described, by way of example only, and with reference to the accompanying drawings in which.

DETAILED DESCRIPTION

Herewith will be described various embodiments of a in servovalve and torque motor, wherein the magnetic elements thereof have a structure designed to improve the magnetic flux through the various components, and in particular the magnetic elements of the servovalve and torque motor thereof.

Figure 2:
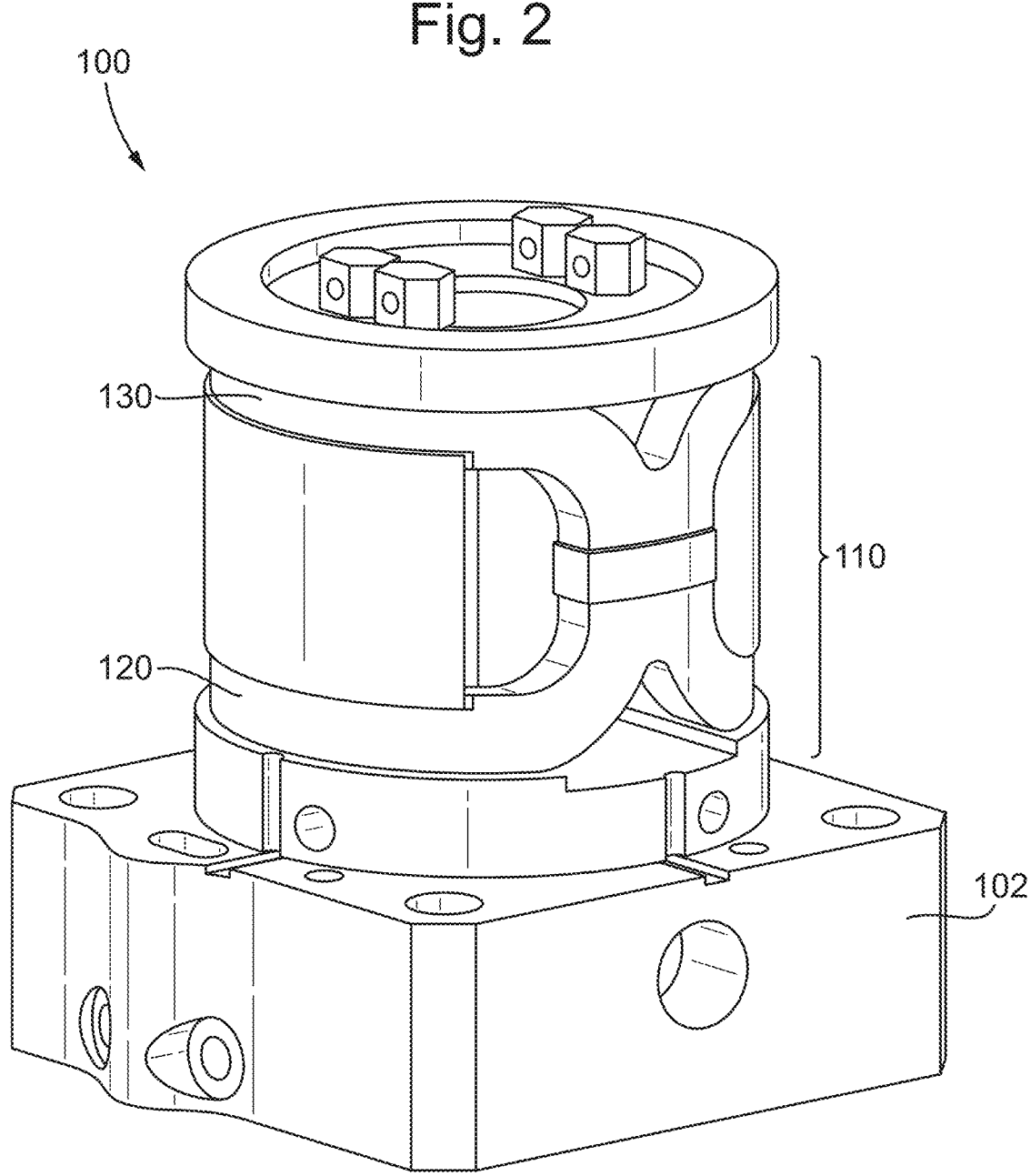
FIG. 2 shows a servovalve in accordance with an embodiment of the disclosure.

FIG. 2 shows a servovalve 100 that may be used in any suitable hydraulic and pneumatic application in order to, for example, control an actuator using a flow of hydraulic or pneumatic fluid. The operation of such a servovalve is well known in the art and will not be described in detail herein.

The servovalve 100 comprises a torque motor 110 that is configured to sit on a base 102 of the servovalve 100. The base 102 of the servovalve 100 contains the various hydraulic, pneumatic or other fluid ports, and as is known in the art the torque motor 110 controls the flow of fluid through the various ports. It should be noted that the torque motor 110 disclosed herein, and various components thereof are considered to be advantageous in their own right, and the broadest aspects of the present disclosure are not limited to the use of the torque motor 110 within the servovalve 100 as shown in FIG. 2.

Figure 3:
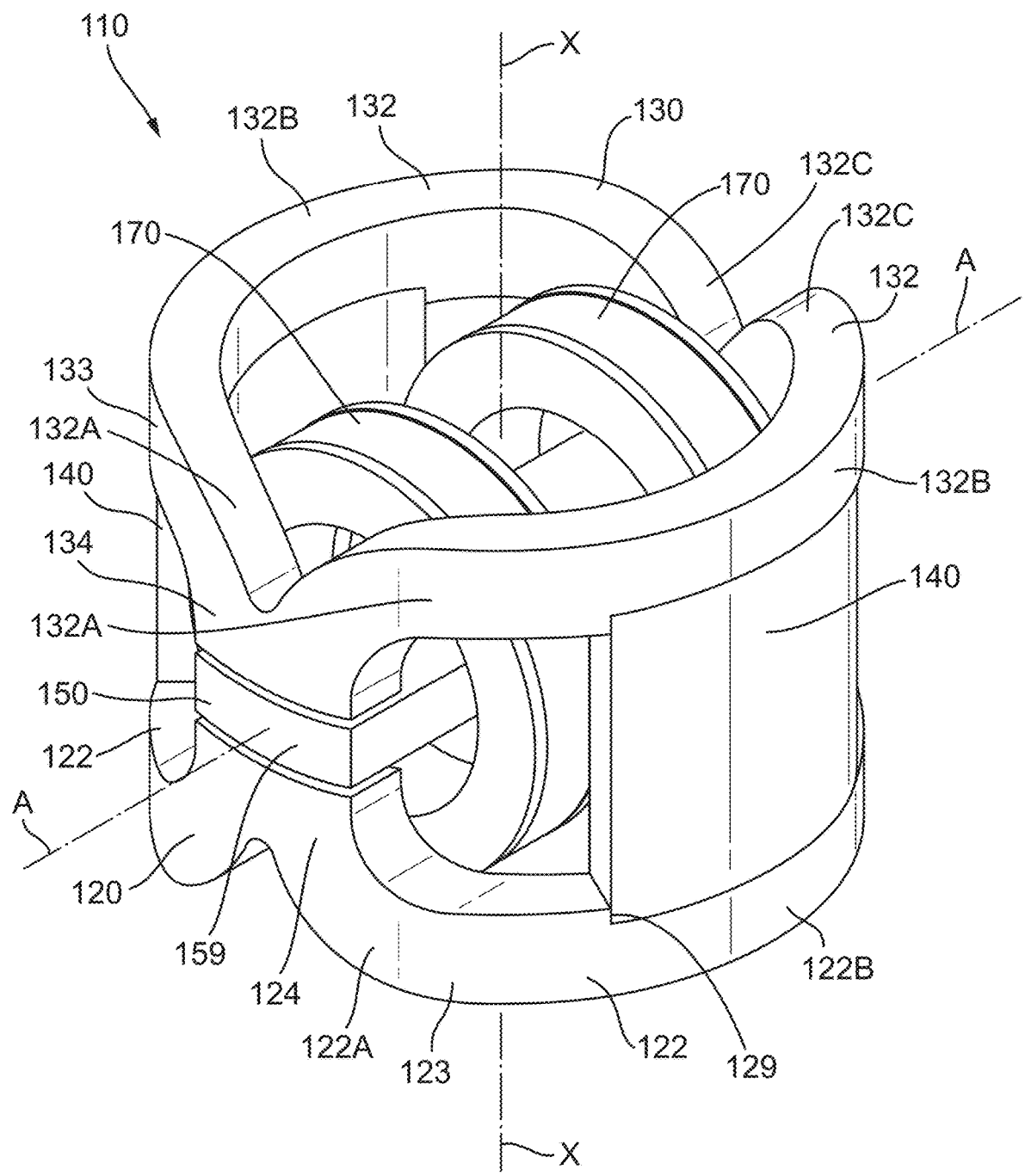
FIG. 3 shows the torque motor of the servovalve of FIG. 2 in isolation.

FIG. 3 shows the torque motor 110 in isolation.

The torque motor 110 comprises a lower pole piece 120 and an upper pole piece 130. The lower pole piece 120 and the upper pole piece 130 are substantially identical, although mirror images of each other. The lower pole piece 120 and the upper pole piece 130 have a substantially circular shape when viewed from above or below (see, e.g., FIG. 4). The lower pole piece 120 and the upper pole piece 130 have a unique shape, in that they are formed by two arcuate or U-members 122, 132 that are attached to one another at diametrically opposed attachment portions 124, 134.

The arcuate members 122, 132 extend from a first of the attachment portions 124, 134 in opposite directions, then follow a substantially circular path such that they meet at a second of the attachment portions 124, 134, which is diametrically opposed to the first attachment portion 124, 134.

Each arcuate member 122, 132 may be formed by three sections 122A-C, 132A-C, wherein a first section 122A, 132A connects to an attachment portion 124, 134 and extends vertically and circumferentially away from the attachment portion 124, 134 to the second section 122B, 132B, which extends circumferentially around the circular path, wherein the second section 122B, 132B then extends into a third section 122C, 132C that extends vertically and circumferentially towards the diametrically opposed attachment portion 124, 134.

An outer circumferential surface 123, 133 of each pole piece 120, 130 has a generally cylindrical profile. For example, when viewed from above (see FIG. 4) the outer cylindrical surface 123, 133 follows a substantially circular path.

The torque motor 110 further comprises an armature 150 that is located between the lower pole piece 120 and the upper pole piece 130. The armature 150 extends along a longitudinal axis A thereof between one of the diametrically opposed locations and the other of the diametrically opposed locations.

The torque motor 110 comprises a central, longitudinal axis X that is perpendicular to the longitudinal axis A of the armature 150.

As discussed above and generally, each arcuate member 122, 132 of the pole pieces 120, 130 extends from a respective attachment portion 124, 134 at least partially in a vertical direction away from the armature 150 and around a circumferential path formed by the general shape of the pole piece 120, 130.

In various embodiments, a cross-section of each arcuate member 122, 132 may be substantially constant along a longitudinal axis (Y) (see FIG. 4) thereof. As will be appreciated from FIG. 3, this cross-section will be substantially square or rectangular, but in various embodiments the cross-section may also be circular or another shape. Use of a constant cross-section in this regard has been found to reduce magnetic losses that can be caused by locally decreased cross-sectional areas, such as those formed by the drill holes 6 in the conventional pole piece described above.

Similar effects may be achieved by reducing the variation in cross-sectional area, as opposed to keeping it exactly constant. As such, in various embodiments the cross section of the arcuate members 122, 132 along their longitudinal axis Y may not change by more than +/−20%, +/−10% or +/−5%.

The torque motor 110 further comprises permanent magnets 140 located on opposed sides of the torque motor 110 and extending between respective arcuate members 122, 132 of the upper pole piece 130 and the lower pole piece 120. The permanent magnets 140 may be arcuate such that they follow the general profile of each arcuate member 122, 132 that they extend between.

In various embodiments, the cross-section of each arcuate member 122, 132 may be substantially constant along its longitudinal axis Y and between its respective attachment portion 124, 134 and the point at which it meets a respective one of the permanent magnets 140, at which point the magnetic flux can dissipate into the permanent magnet 140.

In the illustrated embodiment, a small undercut 129 is present at the point at which the arcuate member 122, 132 meets the permanent magnet 140. This is provided to facilitate positioning of the elements, but may not be present.

Figure 4:
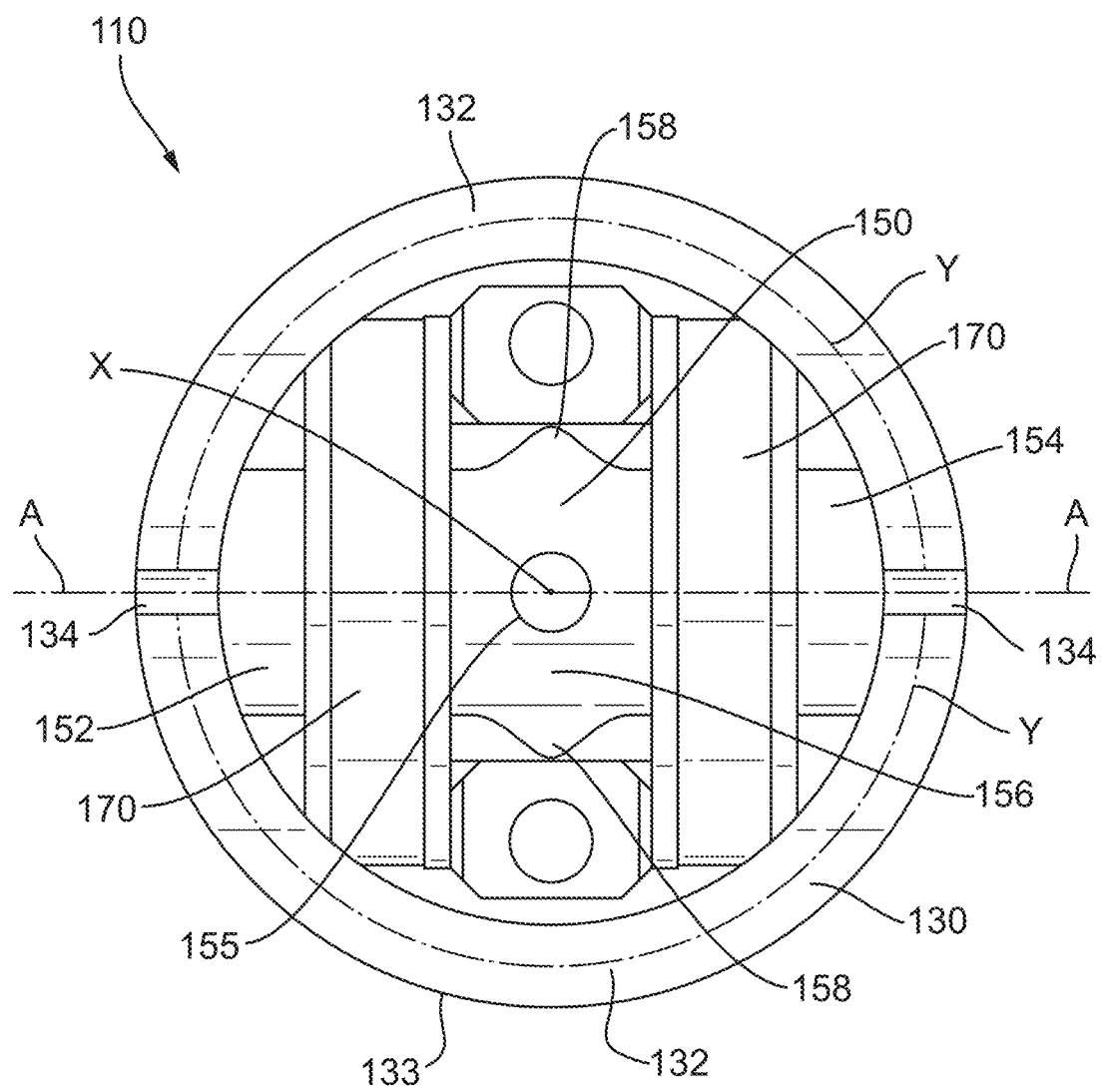
FIG. 4 shows a top view of the torque motor shown in FIG. 3.

As shown in FIG. 4, the armature 150 of the torque motor 110 comprises a substantially solid block of material, which comprises first and second opposed arm portions 152, 154. A central portion 156 of the armature 150 comprises an aperture 155 and notches 158 on opposed sides of the aperture 155. The notches 158 are configured to maintain a constant cross-section of the armature 150 along its longitudinal axis A, taking into account the aperture 155. The volume of the notches 158 may substantially correspond to the volume of the void formed by the aperture 155.

The armature 150 may terminate at end surfaces 159, which end surfaces 159 are perpendicular to the longitudinal axis A of the armature 150. The end surfaces 159 may be curved, and may follow the outer circular or cylindrical contour of the torque motor 110, and specifically the contour of the upper and lower pole pieces 130, 120 as shown in FIG. 4.

The various features described in respect of the armature 150, for example the substantially constant cross-section along its longitudinal axis A, and the curved nature of the end surfaces 159 have been found to reduce magnetic flux losses in accordance with the overall aims of the present disclosure.

The torque motor 110 further comprises one or more electromagnetic coils 170, which extend around a respective arm portion 152, 154 of the armature 150. As is known in the art, application of an electrical current to the electromagnetic coils 170 causes the armature 152 move. This, in turn, causes one or more components of the servovalve 100 to move and fluid within the base portion 102 of the servovalve 100 to be displaced, for example to actuate a component.

Various embodiments of the present disclosure are aimed at providing a smooth magnetic circuit for the torque motor 110, which is designed to provide various technical effects due to the shape and construction of the various components of the torque motor 110.

Figure 1:
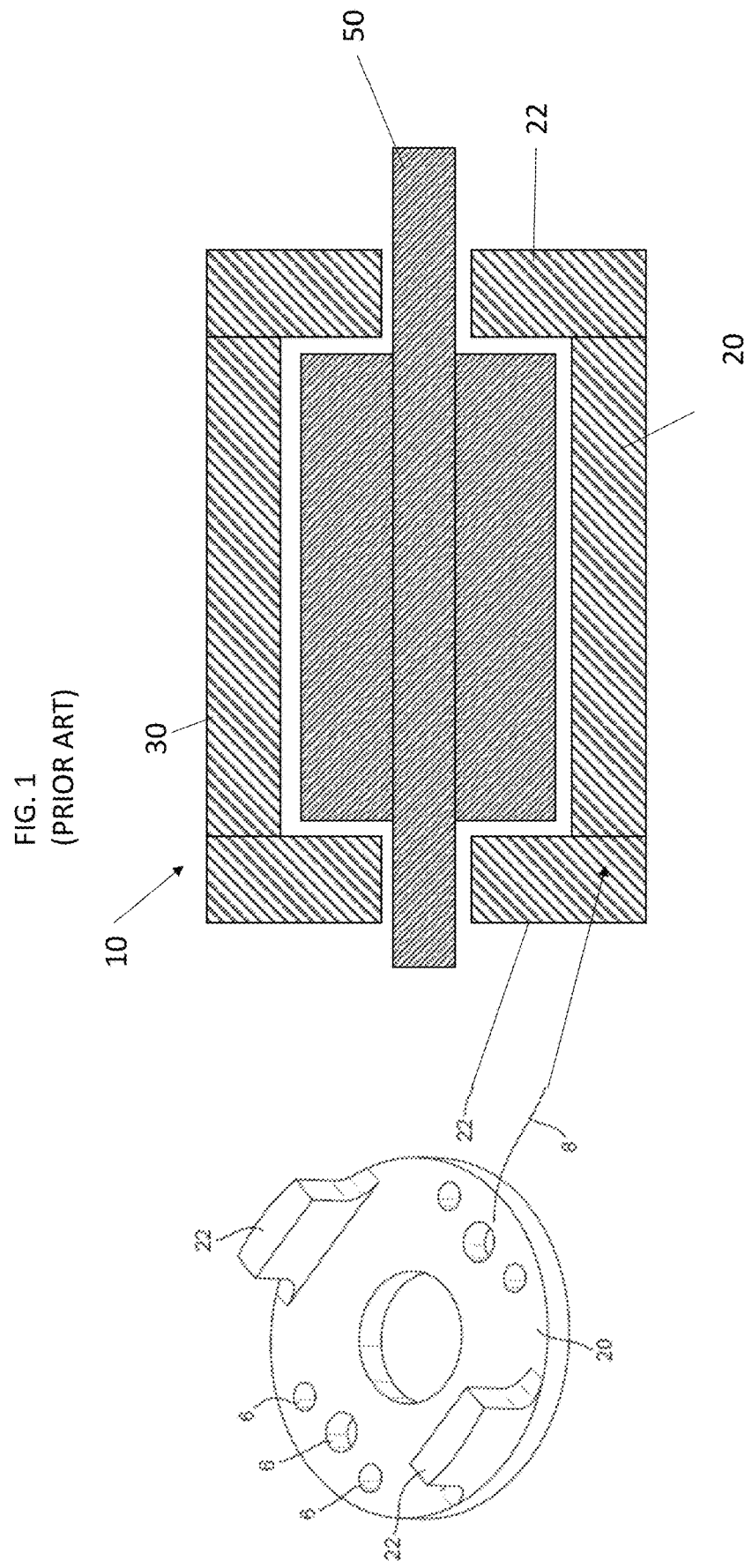
FIG. 1 shows a conventional torque motor and lower pole piece thereof.
Figure 5:
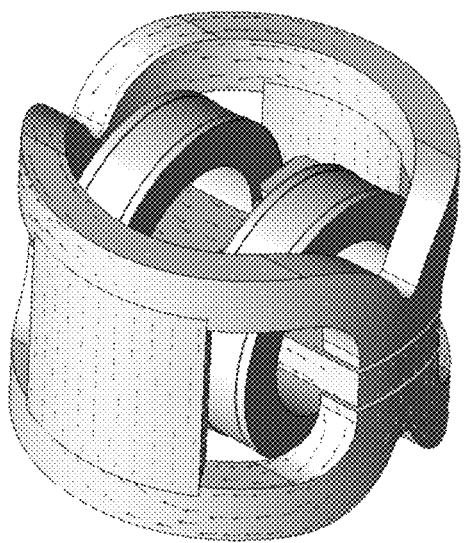
FIG. 5 shows magnetic flux analysis for the torque motor of FIG. 3.
Figure 5:
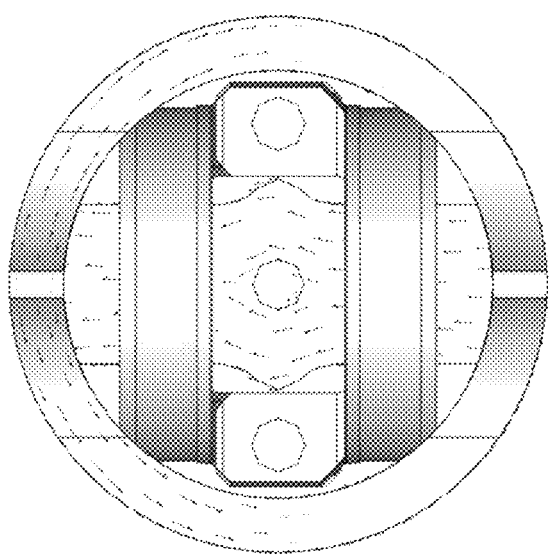
Figure 5:
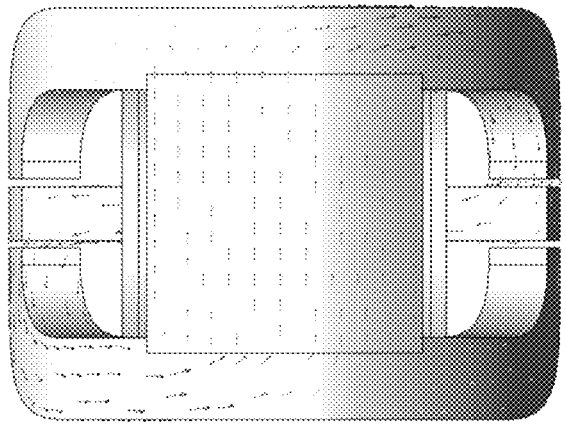
Figure 5:
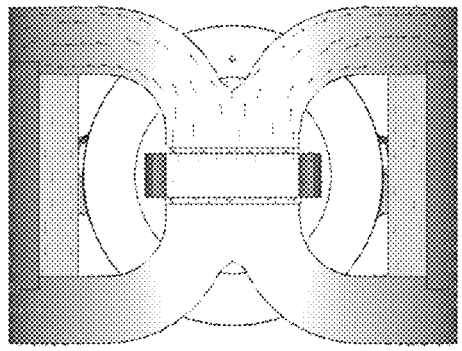

As shown in various finite element simulations (see, e.g., FIG. 5) the torque motor 110 described herein reduces saturation effects of magnetic flux throughout the magnetic circuit of the torque motor 110. This means that the magnetic torque achieved by the torque motor 110 can be higher for a particular application, for example over and above the conventional torque motor shown in FIG. 1.

Use of constant cross-section pieces, or sections of pieces as discussed above can lead to reduced saturation of magnetic flux, and increased magnetic torque. These technical effects mean that the angular stroke for the torque motor 110 may be higher compared to the conventional arrangements.

The manufacturing cost of the components, in particular the upper and lower pole pieces 120, 130 may be decreased, due to the reduced need to, for example, drill through them, and the ability to injection mould the pieces.

As will be appreciated from FIG. 3, the lower pole piece 120, permanent magnets 140 and upper pole piece 130 are constructed such that the upper pole piece 130 is supported (e.g., solely) by the permanent magnets 140 and the lower pole piece 120. This means that there is no need to provide any additional supporting structure for the upper pole piece 130, and it will be held in place on top of the permanent magnets 140. This eliminates the need to drill through the upper and/or lower pole pieces 130, 120 and, in turn, the complications caused by drill holes as discussed above. This has an additional benefit in that the operating temperature range for the torque motor 110 can be increased, due to the elimination of the fasteners that would otherwise extend through the upper and/or lower pole pieces of a conventional torque motor. Furthermore, the mass of the torque motor 110 can be reduced.

Although the present disclosure has been described with reference to various embodiments, it will be understood by those skilled in the art that various changes in form and detail may be made without departing from the scope of the invention as set forth in the accompanying claims.

The invention claimed is:

1. The method of constructing a torque motor, comprising:
providing at least one pole piece formed from a single piece of material and at least partially by two arcuate members extending in opposite directions from a first attachment portion of the pole piece and following a generally circular path defining a perimeter of the pole piece, wherein a cross-section of the arcuate members are devoid of any holes or apertures and meet each other at a second attachment portion diametrically opposed from the first attachment portions of the pole piece, a top surface and a bottom surface of each arcuate member extends vertically and circumferentially away from the first attachment portion.

2. The method as claimed in claim 1, wherein the arcuate members have a substantially constant cross-sectional area along the generally circular path.

3. The method as claimed in claim 1, further comprising:
providing a lower pole piece and an upper pole piece, wherein at least one of the lower pole piece and the upper pole piece consists of the at least one pole piece; and
providing one or more permanent magnets extending between the lower pole piece and the upper pole piece, wherein the permanent magnets are configured to support the upper pole piece in use.

4. A pole piece for a torque motor, wherein the pole piece is a single piece of material formed at least partially by two separate arcuate members, each extending in opposite directions from a first attachment portion of the pole piece and following a generally circular path defining a perimeter of the pole piece, wherein a cross-section of the arcuate members are devoid of any holes or apertures and meet each other at a second attachment portion diametrically opposed from the first attachment portions, of the pole piece, a top surface and a bottom surface of each arcuate member extends vertically and circumferentially away from the first attachment portion.

5. The pole piece as claimed in claim 4, wherein the arcuate members have a substantially constant cross-sectional area along the generally circular path.

6. The pole piece as claimed in claim 4, wherein the arcuate members comprise a square cross-section along the generally circular path.

7. The pole piece as claimed in claim 4, wherein the arcuate members are symmetrically opposed to each other.

8. The pole piece as claimed in claim 4, wherein the first and second attachment portions each comprises a block of material from which each arcuate member extends.

9. The pole piece as claimed in claim 4, wherein an outer circumferential surface of the pole piece has a generally cylindrical profile.

10. An apparatus for a torque motor, comprising:
a lower pole piece;
an upper pole piece; and
one or more permanent magnets extending between the lower pole piece and the upper pole piece, wherein the permanent magnets are configured to support the upper pole piece in use;
wherein each of the lower pole piece and the upper pole piece is a pole piece is a single piece of material formed at least partially by two separate arcuate members, each extending in opposite directions from a first attachment portion of the pole piece and following a generally circular path defining a perimeter of the pole piece, wherein a cross-section of the arcuate members are devoid of any holes or apertures and meet each other at a second attachment portion diametrically opposed from the first attachment portions of the pole piece, a top surface and a bottom surface of each arcuate member extends vertically and circumferentially away from the first attachment portion.

11. The apparatus as claimed in claim 10, wherein the arcuate members have a substantially constant cross-sectional area along the generally circular path.

12. The apparatus as claimed in claim 10, wherein the upper pole piece is supported solely by the permanent magnets in use.

13. The apparatus a claimed in claim 10, in combination with an armature located between the lower pole piece and the upper pole piece to form a torque motor.

14. The apparatus as claimed in claim 13, wherein the armature extends along a longitudinal axis (A), and comprises opposed surfaces located at opposed ends of the armature along the longitudinal axis (A) thereof, wherein the opposed surfaces follow a curved profile corresponding to a curved profile of the lower pole piece and the upper pole piece.

15. The apparatus of claim 13, wherein the apparatus is in a servovalve.

16. The apparatus a claimed in claim 10, wherein the arcuate members comprise a square cross-section along the generally circular path.

17. The apparatus a claimed in claim 10, wherein the arcuate members are symmetrically opposed to each other.

18. The apparatus a claimed in claim 10, wherein each arcuate member extends vertically and circumferentially away from the first attachment portion.

19. The apparatus a claimed in claim 10, wherein an outer circumferential surface of the pole piece has a generally cylindrical profile.

* * * * *